March 13, 1956  L. J. MANN  2,737,783
REFRIGERATING APPARATUS HAVING AIR CIRCULATING MEANS
Filed Feb. 25, 1953  2 Sheets-Sheet 1

INVENTOR.
Leonard J. Mann
BY R. R. Candor
His Attorney

March 13, 1956  L. J. MANN  2,737,783
REFRIGERATING APPARATUS HAVING AIR CIRCULATING MEANS
Filed Feb. 25, 1953  2 Sheets-Sheet 2

INVENTOR.
Leonard J. Mann
BY R. R. Candor.
His Attorney

United States Patent Office 2,737,783
Patented Mar. 13, 1956

2,737,783

REFRIGERATING APPARATUS HAVING AIR CIRCULATING MEANS

Leonard J. Mann, Dayton, Ohio, assignor to General Motors Corporation, Detroit, Mich., a corporation of Delaware Application February 25, 1953, Serial No. 338,641

3 Claims. (Cl. 62—103)

This invention relates to household refrigerators and particularly to a novel air circulation therein.

Since the advent of household refrigerator cabinets having a separate frozen food storage compartment located within and insulated from air in the main food storage chamber thereof and wherein differently temperatured evaporators of a refrigerating system are employed to cool these food storage areas problems relating to the location of the higher temperature evaporator, for cooling the unfrozen food storage chamber, to produce an effective and efficient air circulation together with the appearance of the interior of the refrigerator are increasing. For example, some of the recent refrigerators of this type include an insulated freezing evaporator for cooling the frozen food storage compartment and a frosting and defrosting evaporator exposed to air within the unfrozen food storage chamber for cooling and causing circulation of air within this chamber. Such frosting and defrosting evaporators have been located in the food chamber below the insulated structure, forming the frozen food compartment, in plain view of the user when the refrigerator cabinet door is opened and this has been objectionable because the presence of frost or droplets of water on the evaporator is not a pleasant sight. This location of the frosting and defrosting evaporator does not provide sufficient air circulation within the unfrozen food storage chamber to eliminate warm air pockets forming in certain localities within the chamber and thus the chamber is not cooled uniformly throughout.

An object of my invention is to provide a household refrigerator with a novel, improved and efficient air circulation therein.

Another object of my invention is to induce circulation of cool air around an insulated structure located within and forming a frozen food storage compartment in a refrigerated food storage chamber of a refrigerator cabinet so as to shield the compartment from heat loss and provide cooler temperatures of frozen packaged foods throughout the interior of the frozen food compartment.

Another object of my invention is to arrange an insulated structure forming a freezing compartment in an unfrozen food storage chamber of a refrigerator cabinet in such manner as to produce a more chimney-like cooling effect within the chamber which eliminates warm air pockets therein and provides uniform cooling of food products stored on shelves mounted on the food chamber door.

A further object of my invention is to mount the frosting and defrosting evaporator of a refrigerator having an insulated structure forming a frozen food storage compartment in the upper portion of an unfrozen food storage chamber at a higher point in the chamber whereby the evaporator in addition to creating a more effective circulation of air in the chamber is also concealed from view by the insulated structure when the food chamber door is opened.

In carrying out the foregoing objects it is a still further and more specific object of my invention to mount an insulated box-like structure having a frozen food compartment therein in the upper part of an unfrozen food storage chamber of a refrigerator so as to provide flues therearound, to locate an evaporator of a refrigerating system within one of the flues for inducing circulation of air throughout the chamber, around the insulated structure and to provide means for scooping air from one of the flues and discharging the scooped air into the chamber beneath the box-like structure at a point intermediate certain of the flues.

These and other objects of the invention, the various features and advantages of details of construction and arrangement of elements are hereinafter fully set forth and described in conjunction with the showing in the accompanying drawings, in which.

Figures 1, 4:
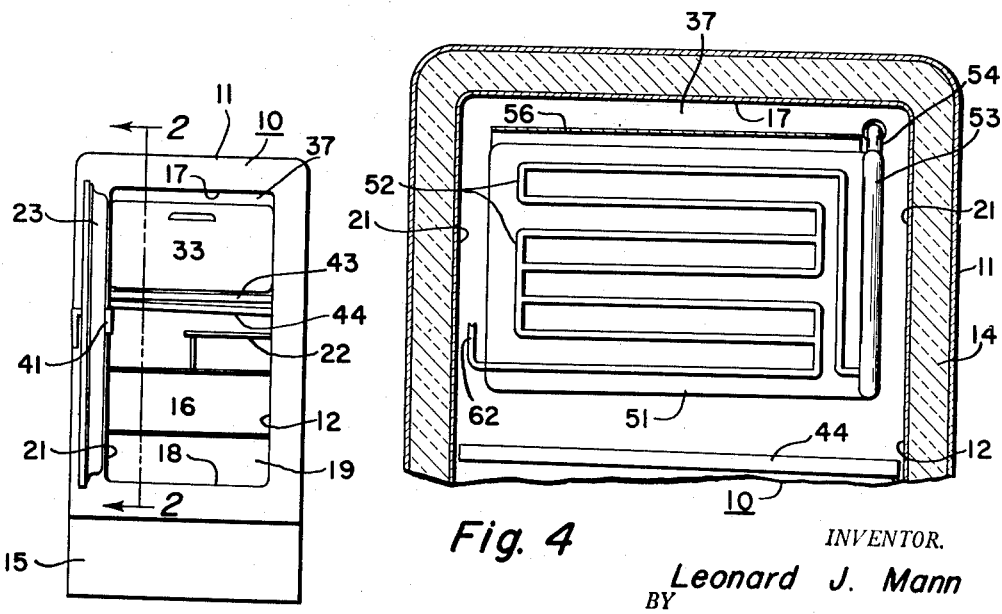
Figure 1 is a front elevational view of a refrigerator cabinet embodying the present invention, the refrigerator cabinet door being shown in open position to expose the interior to view.
Figure 4 is a view in section taken on the line 4—4 of Figure 2 showing in elevation one of the evaporators employed in the refrigerator.
Figure 2:
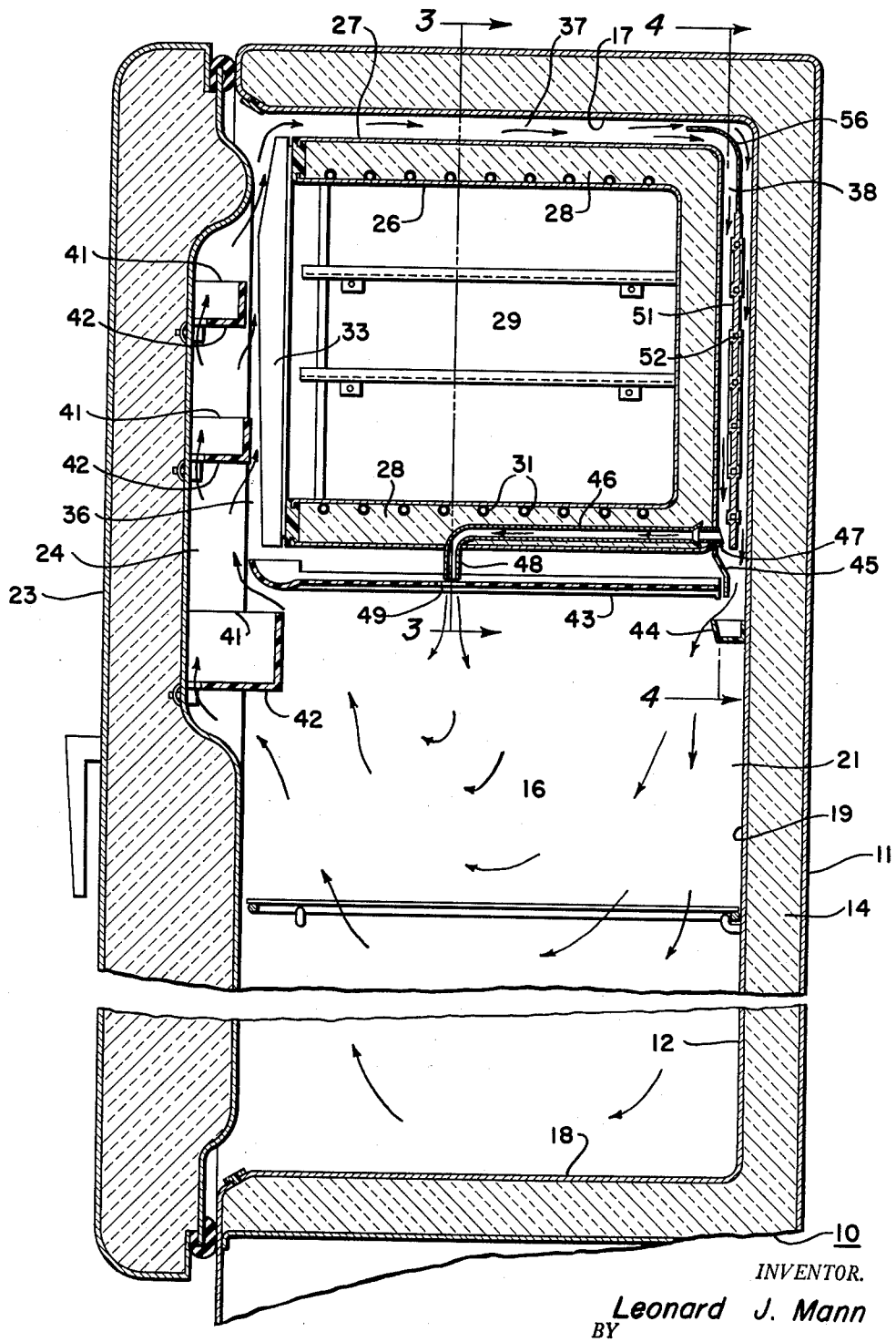
Figure 2 is an enlarged vertical sectional view of the refrigerator taken on the line 2—2 of Figure 1 with the cabinet door shown in closed position.

I show in the drawings a household refrigerator cabinet, generally represented by the reference character 10, having the usual outer panels or shells spaced from a metal liner 12 and suitable insulating material 14 disposed in the space therebetween. A machine compartment, having a front closure 15 (see Figure 1), is provided in the lower portion of cabinet 10 for the reception of a refrigerant translating device of a closed refrigerating system associated with the refrigerator. Liner 12 forms a main or unfrozen food storage chamber 16 in the refrigerator cabinet having top, bottom, back and side walls 17, 18, 19 and 21 respectively. Chamber 16 has a plurality of full size reticulated food supporting shelves mounted therein and an auxiliary half or jack shelf 22 supported upon the uppermost regular shelf as is conventional in refrigerators. An opening in the front of cabinet 10 provides access to this main or unfrozen food storage chamber 16. An insulated door 23, having an inner recessed portion 24 (see Figure 2) is provided for closing the access opening of chamber 16. There is mounted, in any suitable or desirable manner, in the top portion of chamber 16 an insulated box-like structure which extends entirely across or is of a width substantially equal to the width of chamber 16. This structure includes spaced apart inner and outer metallic walls or can-like members 26 and 27 respectively preferably sealed at their edges and having suitable insulating material 28 disposed therebetween. The inner metallic can-like member 26 forms walls of a low temperature freezing or frozen food storage compartment 29 within the insulated box-like structure. The closed refrigerating system associated with cabinet 10 includes, in addition to the refrigerant translating device or unit located in the machine compartment, a cooling unit or freezing evaporator for refrigerating the interior of the frozen food compartment to sub-freezing temperatures. In the present disclosure this refrigerant evaporator is in the form of a conduit 31, disposed in the chamber between the can-like members 26 and 27, coiled around and preferably secured in intimate thermal contact with the can-like member 26.

Means such as a restrictor or expansion valve (not shown) may be employed to control or regulate the flow of refrigerant from the refrigerant translating device into the evaporator conduit 31 to maintain the temperature within compartment 29 well below 32° F. for the storage of frozen food or foods to be frozen therein. A separate insulated door 33 is employed to close the access opening of the frozen food compartment 29, formed by the insulated box-like structure. It is to be understood that this insulated box-like structure is specifically described so as to clearly differentiate the frozen food compartment forming means from a conventional refrigerator in which a compartment is formed by non-insulated walls of an evaporator disposed in such position as to be exposed to air within the unfrozen food chamber of the refrigerator and adapted to cool and cause circulation thereof in the chamber.

In order to reduce heat loss from the frozen food compartment 29, to provide colder temperatures for packaged food in compartment 29, to provide a more chimney-like effect for air circulation in chamber 16 and to conceal the evaporator employed to cool and cause circulation of air in the unfrozen food storage chamber 16, from view when its door 23 is opened, I space the insulated box-like structure from the top and rear walls 17 and 19 respectively of chamber 16. This spacing is to permit a circulation of cool air in chamber 16 over the top and back of the box-like structure which prevents heat loss from the freezing compartment to the exterior of cabinet 10 and provides colder temperatures in the upper and rear portions of this compartment. More specifically it will be noted that door 33 of compartment 29 is spaced from the recessed inner face of door 23 to provide a first flue 36 therebetween, the outer can-like wall member 27 of the insulated box-like structure is spaced from the top wall 17 of liner 12 or chamber 16 to provide a second flue 37 therebetween and this outer can-like wall member 27 of the insulated box-like structure is also spaced from the back wall 19 of liner 12 or chamber 16 to provide a third flue 38 therebetween.

I mount, in any suitable or conventional manner, three shelves 41 on the inner face of the main food chamber door 23 and preferably locate two of these shelves in the first flue 36, between the doors 23 and 33, for a purpose to be more fully disclosed hereinafter. The third or larger shelf 41 is located below the level of a drip pan 43 and projects into chamber 16. Each door shelf 41 comprises an upright front rail portion and an imperforate food supporting base portion 42 having its rear edge spaced from the inner face of door 23 to provide an air passage at the back of the shelf. The drip tray 43 is mounted, in any suitable or desirable manner, below the insulated box-like structure for receiving condensate water which may drip from door 33 of the frozen food storage compartment 29. This tray 43 has its rear edge or lip disposed over a drain trough 44, mounted on the back wall 19 of liner 12 or chamber 16, so that the condensate water received therein will be conveyed from the front of chamber 16 into trough 44 and downwardly along the chamber back wall 19 to a drain outlet (not shown). Trough 44 is also adapted to receive water from evaporator 51 when this evaporator is defrosted. A shield 45 is secured to the insulated box-like structure and is bent outwardly around the rear lip on drip tray 43 to prevent entrance of air from flue 38 into the space between drip tray 43 and the insulated structure. The insulated box-like structure has air scooping conduit means associated therewith. This conduit means is in the form of a plurality of horizontally spaced apart metal ducts 46 disposed in the insulating material 28 of the box-like structure. Each of these ducts 46 has its one end 47 projecting rearwardly from the back of the insulated box-like structure a slight distance into the rear or third flue 38 and has a bent down outlet end 48 projecting out of the bottom of the insulated structure and registering with an opening 49 in tray 43 for a purpose to be hereinafter described. The refrigerating system associated with cabinet 10 also includes a second higher temperature or frosting and defrosting evaporator which I mount centrally within the rear or third flue 38. This evaporator, generally represented by the reference character 51, is of a substantially flat plate-like type formed of superimposed and bonded together embossed metal sheets to provide refrigerant expansion or evaporating passages 52 therebetween. A refrigerant accumulator 53 (see Figure 4) is also formed between the metal sheets of evaporator 51 and is connected to the suction or gaseous refrigerant return conduit 54 which leads to the refrigerant translating device in the machine compartment of cabinet 10. A portion of one of the metal sheets of evaporator 51 or a separate sheet 56 secured thereto extends upwardly from this evaporator and is bent to provide a baffle extending a short distance into the back portion of the upper or second flue 37 for a purpose to be presently described. While I have shown the evaporator 51 as being a second evaporator of a closed circuit refrigerating system it is to be understood that this evaporator could be the refrigerant evaporating portion of a separate secondary closed refrigerating circuit having a condensing portion associated with the evaporator 31, to render the secondary circuit effective, as is conventional in the art.

Figure 3:
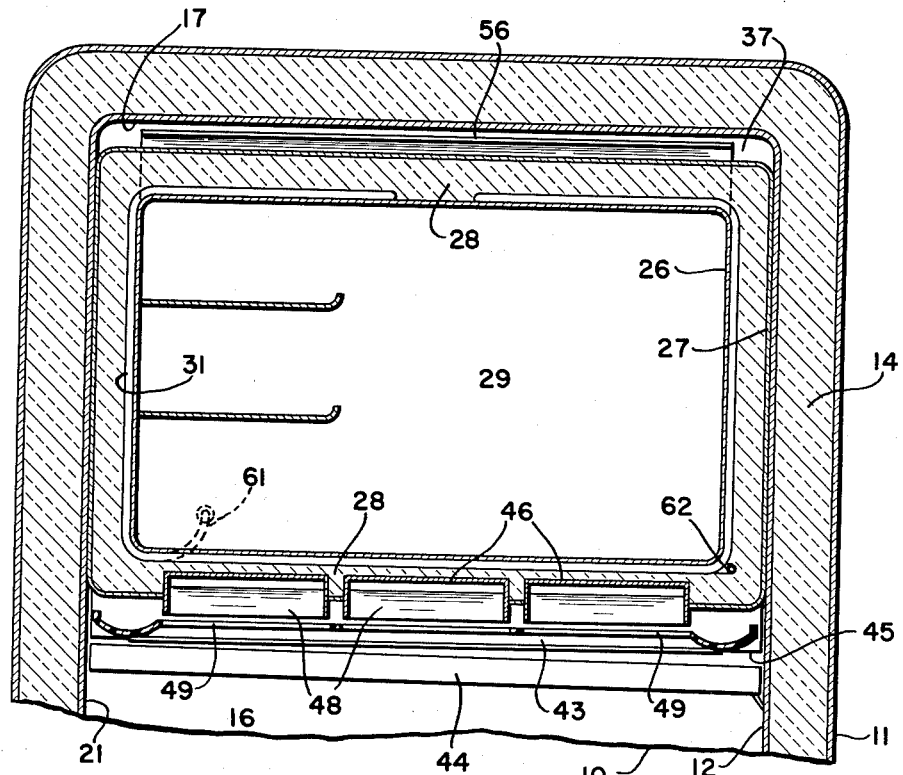
Figure 3 is a vertical sectional view taken on the line 3—3 of Figure 2 showing the discharge outlets of air scooping means employed in the present refrigerator.

A volatile refrigerant is compressed by a compressor of the refrigerant translating device, of the refrigerating system associated with cabinet 10, and conveyed into a condenser wherein it is cooled and liquified. The liquid refrigerant is directed into the freezing evaporator coil 31 by way of a conduit 61 (see Figure 3) and flows out of coil 31 into the passage 52 of the plate-like evaporator 51 by way of a conduit 62 (see Figures 3 and 4). Refrigerant evaporated in these evaporators 31 and 51 is conveyed back to the compressor from accumulator 53 by way of conduit 54. This refrigerant circuit, to provide the desired temperature differential between the evaporators 31 and 51 and cooling of compartment 29 and chamber 16, is conventional and well known to those well skilled in the art. In the type of refrigerator herein disclosed, the plate-like evaporator 51 forms the sole means for cooling and causing circulation of air in the unfrozen food storage chamber 16 as distinguished from prior refrigerators wherein a single evaporator has been employed to both form a freezing compartment and to cool and cause circulation of air in the food storage chamber.

The refrigerating effect produced by evaporator 51 cools air in chamber 16 and causes this air to circulate downwardly out of the rear or third flue 38 into and along the back portion of unfrozen food chamber 16, over foods stored in this chamber and upwardly therein at the front thereof into the first flue 36. The upward circulating air flows around the front of the door shelves 41 and through the space between the rear edge of base portion 42 thereof and the inner face of door 23 to thereby carry away heat which tends to form along the inner face of door 23 in back of foods supported on shelves 41. In this manner an effective cooling of food products on the door shelves 41 is obtained. The upwardly circulating air then flows rearwardly into the horizontal or second flue 37 above the insulated box-like structure forming the frozen food compartment 29. As this air reaches the rear end of flue 37 baffle 56 divides the same into two streams of air one of which flows downwardly in the back or third flue 38 over one or the front side of evaporator 51 while the other flows downwardly over the other or rear side of evaporator 51. Baffle 56 by dividing the circulating air and causing it to flow along opposite sides of plate evaporator 51 provides a quicker and more effective cooling of the air. The end 47 of each duct 46, projecting into flue 38, scoops some of the air circulating downwardly therein laterally therefrom into these ducts. Air scooped by the scooping means or ducts 46 flows forwardly therein and is discharged therefrom through the outlet end 48 thereof and flows through the openings 49 in tray 43 downwardly into the unfrozen food storage chamber 16 intermediate the front and back portions thereof or between the first and third flues 36 and 38 respectively. This scooped air flows over food products stored on the jack shelf 22 and over foods on the uppermost regular shelf to thereby effectively cool the same.

In view of the foregoing it should be apparent that I have provided an improved household refrigerator cabinet wherein a more positive air circulation is obtained to provide substantially even temperatures throughout the interior of the main food storage chamber thereof. My improvement in addition to permitting effective cooling of food products on and adjacent to a jack shelf employed in the refrigerator also eliminates temperature differentials between foods stored within the main storage chamber and those located on the door shelves. By circulating air of the main food storage chamber in the present refrigerator cabinet around walls of an insulated structure having a frozen food compartment therein this compartment is maintained substantially uniform in temperature throughout. Also by locating the evaporator, which cools and causes circulation of air in the main or unfrozen food storage chamber of the refrigerator, in the top portion of the chamber within one of the chimneys or flues a more intense circulation of air is obtained. The specific location of the evaporator, which cools and causes circulation of air in the main food storage chamber, behind the insulated box-like freezing compartment forming means conceals this evaporator from view when the door of the unfrozen food storage chamber is opened to thus improve the appearance of the interior of this chamber.

While the form of embodiment of the invention as herein disclosed constitutes a preferred form, it is to be understood that other forms might be adopted as may come within the scope of the claims which follow.

What is claimed is as follows:

1. A refrigerator comprising in combination, a cabinet provided with an unfrozen food storage chamber therein having a top, bottom, back and side walls, an access opening in the front of said cabinet for said chamber, a door normally closing said chamber access opening, a structure disposed in the upper part of said food chamber including inner and outer walls having insulating material therebetween, said insulated structure having a width substantially equal to the width of said chamber, the inner wall of said insulated structure forming a frozen food storage compartment, said compartment having an access opening facing the food chamber door, a door normally closing said frozen food storage compartment access opening, refrigerating means associated with said cabinet including a freezing evaporator for cooling said frozen food storage compartment and a higher temperature evaporator for said unfrozen food storage chamber, said doors being spaced from one another to provide a first flue therebetween, the outer wall of said insulated structure being spaced from the top and back walls of said food chamber to provide a second flue above said structure and a third flue at the rear thereof respectively, said flues being in open communication with one another and with said unfrozen food storage chamber below said insulated structure, said higher temperature evaporator of said refrigerating means being disposed in the flue at the rear of said insulated structure and concealed from view thereby when said food chamber door is opened, a plurality of shelves mounted on said food chamber door, at least one of said shelves being disposed in said first flue and having portions thereof spaced from the inner face of said food chamber door, said higher temperature evaporator cooling and causing air to circulate downwardly out of said third flue into said chamber forwardly and upwardly therein into said first flue and through the space between said one shelf and the inner face of said chamber door thence through said second flue, conduit means projecting into said third flue for scooping some of the air circulating downwardly therein laterally therefrom, and said conduit scooping means having an outlet disposed at a point intermediate said first and said third flues for discharging the scooped air downwardly into said unfrozen food storage chamber.

2. A refrigerator comprising in combination, a cabinet provided with an unfrozen food storage chamber therein having a top, bottom, back and side walls, an access opening in the front of said cabinet for said chamber, a door normally closing said chamber access opening, a box-like structure having inner and outer walls with insulating material therebetween disposed in the upper part of said food chamber and extending entirely thereacross, the inner wall of said insulated box-like structure forming a frozen food storage compartment, said compartment having an access opening facing said food chamber door, a door normally closing said frozen food storage compartment access opening, a refrigerating means associated with said cabinet including a freezing evaporator for cooling said frozen food storage compartment and a frosting and defrosting substantially flat plate-like evaporator for said unfrozen food storage chamber, said doors being spaced from one another to provide a first flue therebetween, the outer wall of said insulated box-like structure being spaced from the top and back walls of said food chamber to provide a second flue above said structure and a third flue at the rear thereof respectively, said flues being in open communication with one another and with said unfrozen food storage chamber below said insulated box-like structure, said plate-like evaporator of said refrigerating means being disposed in said third flue and spaced from said food chamber back wall and from the rear outer wall of said insulated box-like structure, said plate-like evaporator being concealed from view by said insulated box-like structure when said food chamber door is opened, a plurality of shelves mounted on said food chamber door, at least one of said shelves being disposed in said first flue and having portions thereof spaced from the inner face of said food chamber door, said plate-like evaporator cooling and causing air to circulate downwardly on each side thereof out of said third flue into said chamber forwardly and upwardly therein into said first flue and through the space between said one shelf and the inner face of said chamber door thence through said second flue, a plurality of conduits embedded in the insulating material of the bottom portion of said box-like structure, said conduits having one end thereof projecting into said third flue for scooping some of the air circulating downwardly therein on one side of said plate-like evaporator laterally therefrom, and said conduits each having an outlet opening intermediate said first and said third flues for discharging the scooped air downwardly into said unfrozen food storage chamber.

3. A refrigerator comprising, a cabinet provided with an unfrozen food storage chamber therein having a top, bottom, back and side walls, an access opening in the front of said cabinet for said food chamber, a door normally closing said chamber access opening, a structure disposed in the upper part of said food chamber including inner and outer walls with insulating material therebetween, the inner wall of said insulated structure forming a frozen food storage compartment within said chamber, said compartment having an access opening facing the food storage chamber door, a door normally closing said frozen food compartment access opening, refrigerating means associated with said cabinet including a freezing evaporator for cooling said frozen food storage compartment and a higher temperature evaporator for said unfrozen food storage chamber, said doors being spaced from one another to provide a first flue therebetween, the outer wall of said insulated structure being spaced from the top and back walls of said food chamber to provide a second flue above said structure and a third flue at the rear thereof, said flues being in open communication with one another and with said unfrozen food storage chamber below said insulated structure, at least a portion of said higher temperature evaporator being disposed in said third flue at the rear of the insulated structure, said higher temperature evaporator cooling and causing air to circulate downwardly out of said third flue into said chamber forwardly and upwardly therein thence through said first and said second flues, and means for scooping some of the air circulating downwardly in said third flue and by-passing the outlet thereof to discharge the scooped air into the upper central portion of the unfrozen food storage chamber below said insulated structure between the first and third flues.

References Cited in the file of this patent

UNITED STATES PATENTS

| | | |
|---|---|---|
| 2,072,567 | Potter | Mar. 2, 1937 |
| 2,261,683 | Kuenzli | Nov. 4, 1941 |
| 2,496,220 | Kleist | Jan. 31, 1950 |
| 2,565,995 | Spencer | Aug. 28, 1951 |